(12) United States Patent
Ballen et al.

(10) Patent No.: US 6,567,215 B2
(45) Date of Patent: May 20, 2003

(54) BEADED REAR PROJECTION SCREEN WITH TUNABLE GAIN

(75) Inventors: Todd A. Ballen, St. Paul, MN (US); Robert S. Moshrefzadeh, Oakdale, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/945,929

(22) Filed: Sep. 4, 2001

(65) Prior Publication Data

US 2003/0053207 A1 Mar. 20, 2003

(51) Int. Cl.⁷ .................. G03B 21/60; G03B 21/56
(52) U.S. Cl. ............. 359/453; 359/443; 359/456; 359/460
(58) Field of Search ................... 359/453, 443, 359/456, 452, 460

(56) References Cited

U.S. PATENT DOCUMENTS

| | | | |
|---|---|---|---|
| 3,552,822 A | | 1/1971 | Altman .................. 359/453 |
| 4,361,382 A | | 11/1982 | Miyoshi et al. .......... 359/453 |
| 5,066,099 A | * | 11/1991 | Yoshida et al. .......... 359/457 |
| 5,563,738 A | | 10/1996 | Vance .................. 359/614 |
| 5,781,344 A | * | 7/1998 | Vance .................. 359/614 |
| 6,076,933 A | | 6/2000 | DiLoreto et al. ........ 359/614 |
| 6,096,159 A | | 8/2000 | Ito et al. .............. 156/344 |
| 6,172,814 B1 | | 1/2001 | Watanabe et al. ........ 359/619 |
| 6,204,971 B1 | | 3/2001 | Morris et al. .......... 359/619 |
| 6,262,840 B1 | * | 7/2001 | Watanabe et al. ........ 359/453 |
| 6,344,263 B1 | * | 2/2002 | Moshrefzadeh et al. ... 428/206 |

FOREIGN PATENT DOCUMENTS

| | | |
|---|---|---|
| EP | 0 542 548 A2 | 5/1993 |
| JP | HEI 3 53232 | 3/1991 |
| JP | HEI 5 273651 | 10/1993 |
| JP | 97096870 | 4/1997 |
| JP | 98206973 | 8/1998 |
| WO | WO 98/45753 | 10/1998 |
| WO | WO 99/50710 | 10/1999 |

* cited by examiner

Primary Examiner—Russell Adams
Assistant Examiner—Magda Cruz
(74) Attorney, Agent, or Firm—Robert J. Pechman

(57) ABSTRACT

The present invention provides a beaded rear projection screen that has performance properties such as gain and viewing angle that can be tuned by using a mixture of two or more types of microbeads having different refractive indices and varying the mixture. The present invention further provides methods of selecting microbeads and the construction of the screen so that transmission through the screen can remain sufficiently high throughout the range of tunability.

7 Claims, 3 Drawing Sheets

BEADED REAR PROJECTION SCREEN WITH TUNABLE GAIN

The present invention relates generally to beaded rear projection screens, and more specifically to rear projections screens that incorporate beads of different refractive indices.

BACKGROUND

Rear projection screen displays based on glass microspheres (or beads) embedded in an opaque matrix have been growing in popularity for various uses, such as in large format televisions. A rear projection screen is a sheet-like optical device having a relatively thin viewing layer that is placed at an image surface of an optical projection apparatus. Such a screen makes visible a real image focused by a projection apparatus onto the image surface. The viewing layer is typically planar corresponding to the image surfaces produced by a projection apparatus. Other shapes are possible if the image surface of the projection apparatus is not planar. The screen is intended to act as a filter to attenuate, block, or diffuse light which is not part of the projected image, and to transmit from its rear side to its front side that light which is part of the projected image. In this way it enables the viewer to see the projected image when looking at the front side of the screen.

In a typical construction, the transparent microspheres are embedded in an opaque binder material with the rear portion of the microspheres exposed to light from the projection apparatus. The front portions of the microspheres may extend partly through the opaque binder material to contact the screen substrate. The contact areas form optical apertures between each microsphere and the substrate. The area surrounding each optical aperture is opaque, and preferably black, due to the opaque binder material in the microsphere interstices. As a result, ambient light incident in these areas can be absorbed.

SUMMARY OF THE INVENTION

In some circumstances, it might be desirable to have the capability to provide beaded rear projection screens having a particular gain or viewing angle for one application and to provide beaded rear projection screens having different gains or viewing angles for one or more other applications, all while using the same beads. For example, a screen manufacturer might have a limited selection of bead indices due to available inventories, or for other reasons might prefer to use only certain index beads, while at the same time having different customers that desire screens having different gains, viewing angles, or other performance characteristics. The present invention provides a solution. In the present invention, a rear projection screen construction can be determined in which two or more pre-determined bead types with different refractive indices can be mixed in various ratios to tune the gain, viewing angle, or other performance characteristics within a desirable range.

The present invention amounts to more than a realization that gain and other screen properties can be tuned by mixing different index beads. In the present invention, it is also recognized that the screen construction can be modified or selected so that the chosen beads result in a high performance screen regardless of the mixing ratio. The present invention further provides a method of selecting bead indices for a given screen construction to achieve highly predictable tuning of screen performance while maintaining relatively high transmission. As such, the present invention provides rear projection screens incorporating two or more different index beads, and additionally provides the ability to tune gain and viewing angle of these screens over a wide range without significantly sacrificing throughput.

In one aspect, the present invention provides a method of making a beaded rear projection screen. The method includes determining a model screen construction that includes a substrate transmissive to visible light, a visible light absorptive material disposed on the substrate, a layer of microbeads partially embedded in the light absorptive material to leave a side of the microbeads exposed, and an optional overcoat disposed over the exposed side of the microbeads. The method further includes calculating throughput for the model screen construction as a function of microbead refractive index so that a theoretical maximum throughput can be determined. The method also includes determining a range of microbead refractive indices such that any refractive index in the range when used as the refractive index of the microbeads in the model screen construction would result in a calculated screen throughput of about 90% or more of the theoretical maximum throughput. Finally, the method includes choosing a first microbead type having a first refractive index within the determined range, choosing a second microbead type having a second refractive index within the determined range, the second refractive index being different from the first refractive index, and mixing and dispersing a ratio of the first microbeads and the second microbeads to form a substantially uniformly dispersed layer of microbeads for a beaded rear projection screen that has a construction that functionally matches the model screen construction. By "functionally matches" it is meant that the beaded projection screen that is made has essentially the same construction as the model screen (except for including multiple bead types rather than a single bead type), and that minor variations in layer thicknesses, refractive indices, and other properties may exist.

In another aspect, the present invention provides a method for making a beaded rear projection screen that includes the steps of providing a first plurality of microbeads having a first index of refraction, providing a second plurality of microbeads having a second index of refraction, and determining a model screen construction. The model screen construction includes a substrate transmissive to visible light, a visible light absorptive material disposed on the substrate, a layer of microbeads partially embedded in the light absorptive material to leave a side of the microbeads exposed, and an optional overcoat disposed over the exposed side of the microbeads, wherein the model screen construction has a theoretical maximum throughput for a given microbead refractive index, and wherein the model screen construction is determined such that when microbeads having the first index and microbeads having the second index are present as the layer of microbeads, the resulting screen has a theoretical throughput that is about 90% or more of the maximum theoretical throughput. The screen can then be made by mixing and dispersing a ratio of the first type of microbeads and the second type of microbeads to form a uniform layer of microbeads for a beaded rear projection screen that has a construction that is substantially the same as the model screen construction.

In another aspect, the present invention provides a rear projection screen that includes a beaded screen construction comprising a substrate transmissive to visible light, a visible light absorptive material disposed on the substrate, and a layer of microbeads embedded in the light absorptive material to leave a portion of the microbead layer exposed, wherein the beaded screen construction has a maximum throughput, and $n_{T_{max}}$ defines a microbead index of refraction at which the maximum throughput is attained, and wherein the layer of microbeads comprises a plurality of first microbeads having a first index of refraction and a plurality of second microbeads having a second index of refraction, the first index of refraction being in a range of $n_{T_{max}} \pm 0.05$, inclusive, and the second index of refraction being less than the first index of refraction.

In yet another aspect, the present invention provides a rear projection screen that includes a beaded screen construction comprising a substrate transmissive to visible light, a visible light absorptive material disposed on the substrate, and a layer of microbeads embedded in the light absorptive material to leave a portion of the microbead layer exposed, wherein the beaded screen construction has a maximum theoretical throughput, $n_T$ defines a microbead index of refraction at which the maximum theoretical throughput is attained, and $n_a$ to $n_b$ defines a range of microbead indices that includes $n_T$ and all other refractive indices that yield a calculated throughput of about 90% or more of the maximum theoretical throughput, and wherein the layer of microbeads comprises a first plurality of microbeads that have a refractive index of about $n_a$ and a second plurality of microbeads that have a refractive index of about $n_b$.

In still another aspect, the present invention provides a rear projection screen that includes a substrate transmissive to visible light, a visible light absorptive material disposed on the substrate, and a layer of microbeads partially embedded in the light absorptive material to leave the microbeads exposed to an air interface, the layer of microbeads consisting essentially of a uniform dispersion of about 1.65 refractive index microbeads and about 1.5 refractive index microbeads.

In a further aspect, the present invention provides a rear projection screen that includes a substrate transmissive to visible light, a visible light absorptive material disposed on the substrate, and a layer of microbeads partially embedded in the light absorptive material to leave the microbeads exposed to an air interface, the layer of microbeads consisting essentially of a uniform dispersion of about 1.65 refractive index microbeads and about 1.5 refractive index microbeads, wherein the rear projection screen has a gain that corresponds to the gain of a theoretical screen having the same construction but with a layer of microbeads that includes only microbeads having an index of refraction about equal to $(1.65a+1.5b)/(a+b)$, where a:b is the ratio of 1.65 index microbeads to 1.5 index microbeads.

BRIEF DESCRIPTION OF THE DRAWINGS

The invention may be more completely understood in consideration of the following detailed description of various embodiments of the invention in connection with the accompanying drawings, in which.

Figure 1:
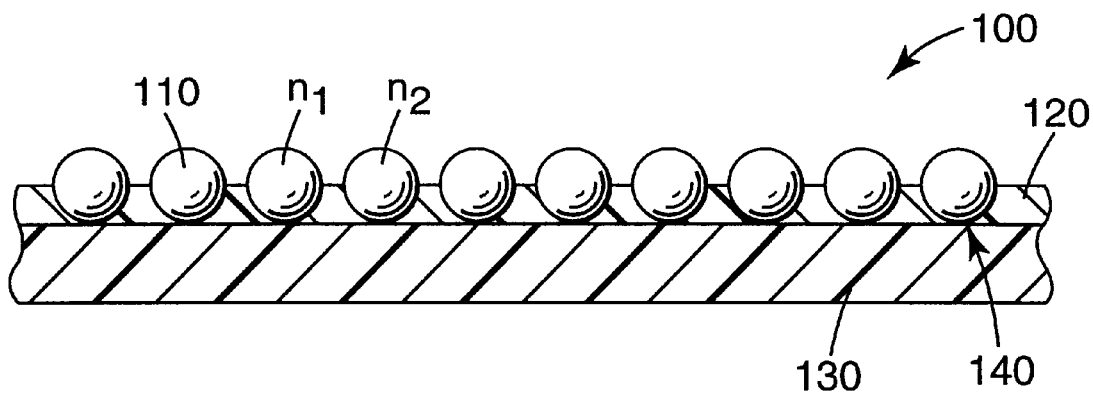
FIG. 1 is a partial schematic side view of a two bead rear projection screen.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTIONS

The present invention provides a beaded rear projection screen that includes at least two different index beads. The present invention also provides the ability to select the refractive indices of the two or more bead types that can be mixed in a range of ratios to achieve one or more pre-selected or otherwise desirable performance characteristics. For example, two different bead types can be mixed to achieve a particular gain, while at the same time maintaining a relatively high peak transmission. For rear projection screens that incorporate two or more different index beads, the present invention can be used to determine what bead indices may be used for a given screen construction, to determine what screen constructions may be used for two or more given bead indices, to determine what range of bead indices may be used to maintain sufficiently high throughput and allow for adjusting (or tuning) the gain in a desired range, to determine screen constructions and bead indices that may be used when making a screen having a desired gain (or a gain tunable over a desired range) while maintaining sufficiently high throughput, and the like.

For the purposes of the present document, gain is defined as the ratio of the on-axis luminance of the screen to the on-axis luminance of a Lambertian source having the same integrated incident light. Throughput (or transmission) is defined as the fraction (or percentage) of normally incident (i.e., on-axis) light that is transmitted through the screen.

According to the present invention, the gain of a rear projection screen can be tuned by using two or more different index beads that are substantially uniformly mixed in the bead layer of the screen, and where the indices of the beads are selected to yield throughputs that are at or near the theoretical maximum throughput for a given beaded screen. Thus, the present invention contemplates tuning the gain of a rear projection screen by mixing different index beads in various amounts, selecting the bead indices to achieve sufficiently high throughput for a particular gain or for a range of gains in which tuning is desired, and modifying or selecting a screen construction so that the gain can be tuned while maintaining acceptable throughput. Each of these can be performed according to the present invention independently or simultaneously and in any combination. The decision on which approach to take will often depend on which variable is least controllable.

For example, in situations where the bead indices have been pre-determined (e.g., due to pre-existing microsphere inventories), the present invention can be used to determine what screen constructions may be used to achieve desired gain (or viewing angle) and throughput performance. In situations where a particular gain or range of gains are pre-determined, the present invention can be used to select one or more of the bead indices and/or to determine the screen construction. In situations where the screen construction has been set, the present invention can be used to select one or more of the bead indices to achieve desired gain (or viewing angle) and throughput performance.

While the present invention contemplates forming beaded screens incorporating a mixture of two or more types of microspheres, each type of microsphere having a different refractive index, the case of a two-bead screen is particularly illustrative. Thus, without loss of generality, the discussion that follows may provide examples of two-bead screens to illustrate aspects of the present invention as it is recognized that other multiple-bead screen constructions of the present invention can embody the same or similar aspects.

FIG. 1 shows a portion of a beaded rear projection screen 100 that includes a layer of microspheres (or beads) 110 partially embedded in a light absorbing material 120 to leave the rear side of the beads exposed. The beads 110 and light absorbing material 120 are disposed on a light transmissive substrate 130. The beads 110 are embedded in the light absorbing material 120 so that an area on the front portions of the beads contacts or nearly contacts substrate 130. The areas of contact or near contact 140 form the apertures for light transmission through the screen when light or images generated by a projector engine or other suitable display apparatus illuminates the back side of the rear projection screen (i.e., the exposed-bead side of the screen).

Other layers, coatings, or elements can be optionally provided in addition to those shown in FIG. 1. For example, a transmissive material can be used to form an overcoat over the exposed side of the beads (overcoat not indicated in FIG. 1). A thicker or more rigid substrate can be laminated to the front of the screen, for example to provide mechanical support. Antireflective coatings, matte finishes, etc., can be provided on the front of the screen to reduce glare. Diffuser particles can be incorporated into the screen substrate or other layers to reduce speckle, provide a matte look, or the like. Various optical films, polarizers, retarders, compensators, lenses, light management or brightness enhancement films, and the like can also be provided in front of or behind the screen as desired. Suitable beaded rear projection screen constructions are disclosed, for example, in U.S. Pat. Nos. 6,204,971; 6,172,814; and 5,563,738, and in International Publication Nos. WO 99/50710 and WO 98/45753.

In the present invention, beaded screens are provided that include beads of at least two different refractive indices, indicated by $n_1$ and $n_2$ in FIG. 1. The different index beads are substantially uniformly dispersed in the layer of beads. Substantially uniformly dispersing the beads allows an averaging of the optical effects of each bead type over a usable area of the screen. For different index beads having similar sizes and having indices that are sufficiently close (e.g., about a 20% to 30% difference in some circumstances), a multiple-bead type screen can function essentially like single-bead type screen whose beads have a refractive index about equal to the weighted average of the refractive indices of the various types of beads used in the multiple-bead screen. Thus, the effective bead index $N_{eff}$ can be calculated by:

$$N_{eff} = \sum_{j=1}^{J} w_j n_j$$

where J is the total number of bead types, $n_j$ is the index of the $j^{th}$ bead type, and $w_j$ is the fractional amount of the $j^{th}$ bead type in the bead mixture so that the sum of all $w_j$'s is equal to 1.

For example, in the construction shown in FIG. 1, 1.5 index beads and 1.65 index beads uniformly dispersed at a 1:2 ratio would produce a screen that functions similarly to a single bead type screen having 1.6 index beads, assuming similar bead packing density. Thus, by mixing beads at different ratios, performance characteristics of the screen can be tuned. This allows screen performance factors to be more easily tuned over a wider range as compare to single-bead screen constructions.

Microspheres useful as beads in screens of the present invention include visibly transparent glass beads (commercially available in a variety of indices) or beads made of other materials, such as polymeric beads. Suitable microspheres typically have sizes in a range of about 10 to 200 microns in diameter, although smaller or larger beads might be preferred for a particular application. When mixing two or more different types of beads (e.g., beads having different refractive indices), it may be desirable for the different bead types to have similar sizes and/or densities to help ensure more uniform mixing and dispensing. Suitable refractive indices of the beads can depend on the application, and may be available in the range of about 1.3 to 3.2, more typically in the range from about 1.3 to 2.5. Glass beads such as those disclosed in U.S. Pat. No. 6,204,971 may be particularly useful as microspheres in the present invention.

Referring back to FIG. 1, light absorbing layer 120 can perform various functions including increasing the contrast of the screen by absorbing a significant amount of ambient light, thereby reducing glare and other reflections that would otherwise tend to reduce contrast. The light absorbing layer can also function to support the microspheres, define the exit aperture of the microspheres, and control light passing through the interstices between microspheres. Ideally, the opacity of the material forming the light absorbing layer is sufficiently high to reduce or eliminate transmission of light through the interstitial areas and to absorb significant amounts of ambient light. In addition, depending on the construction of the screen, a portion of the light absorbing layer may reside between the aperture portion of the microspheres and the substrate. In these cases, the thickness of that portion of the light absorbing layer and/or the absorption coefficient of the light absorbing layer material should be sufficiently low to allow sufficient light to be transmitted.

The light absorbing layer may be made from a wide variety of materials. The choice of material preferably produces suitable adhesive bonding to the microspheres, and is sufficiently opaque as described above. Preferred materials for the light absorbing layer are polymeric materials that will accept colorants, such as a dye, pigment, or carbon black. Preferably, black colorants are used. It may also be a powder coating of carbon black, black dyes, opaque particles or inorganic particles, or such particles dispersed within a polymeric binding material.

Preferably, the light absorbing layer is able to be coated on the substrate for example, and held in a softened state until microspheres can be placed on the coating and pressed into the light absorbing layer. A preferred such material is an acrylate loaded with carbon black to make it opaque. Various thermoplastic or thermoset polymers, particularly thermal or UV-curable polymers, can be used.

Referring again to FIG. 1, substrate 130 can be of any material that is substantially transparent to visible light. Polymeric materials such as polymethylmethacrylate, polyethylene terephthalate (PET), and polycarbonate have been found suitable. While polymeric materials have the advantage of light weight and flexibility, glass may also be used. It may also be desired to have the refractive index difference between the substrate and the light absorbing layer to be small over the range of visible wavelengths. The substrate can also be processed to include an optical diffuser on one or both of its surfaces or in its bulk.

Substrate 130 can be a single layer of a single material, or can include multiple layers and/or multiple materials. For example, substrate 130 can include a thin layer of clear material at the absorptive layer interface to accommodate beads that partially extend through the absorptive layer, such as the clear layers disclosed in International Publication WO 99/50710.

A beaded rear projection screen like that shown in FIG. 1 can be made by coating a light absorbing material on a suitable substrate, depositing a substantially uniformly dispersed mixture of microspheres of at least two different refractive indices in a layer on the light absorbing material, embedding the layer of microspheres into the light absorbing layer, removing any excess microspheres, and optionally providing the exposed portions of the microspheres with an overcoat. To achieve uniformly dispersed mixtures of two bead types, it is preferred that the bead types are about the same size (or have at least somewhat overlapping ranges of sizes), and that the bead types have densities that are sufficiently close (e.g., within 25%). For many two bead systems, the density parameter is typically met when beads made of similar materials are used (e.g., two different glass bead types, two different polymer bead types, etc.) and when the index of refraction difference between the two bead types is relatively small (e.g., refractive index difference of 1 or less, more suitably 0.7 or less, more suitably 0.5 or less, even more suitably 0.3 or less). The beads can be mixed and dispensed in a variety of ways, such as disclosed in U.S. Pat. No. 6,204,971.

In determining what microspheres are to be used and/or what screen construction to make, it can be useful to first model the performance of a model beaded screen construction that includes only one bead type. The present invention contemplates calculating throughput versus bead index for various model single-bead screen constructions, and using this information to determine a two-bead screen construction (or other multiple-bead screen construction) that is suitable for achieving desired performance characteristics.

Figure 2:
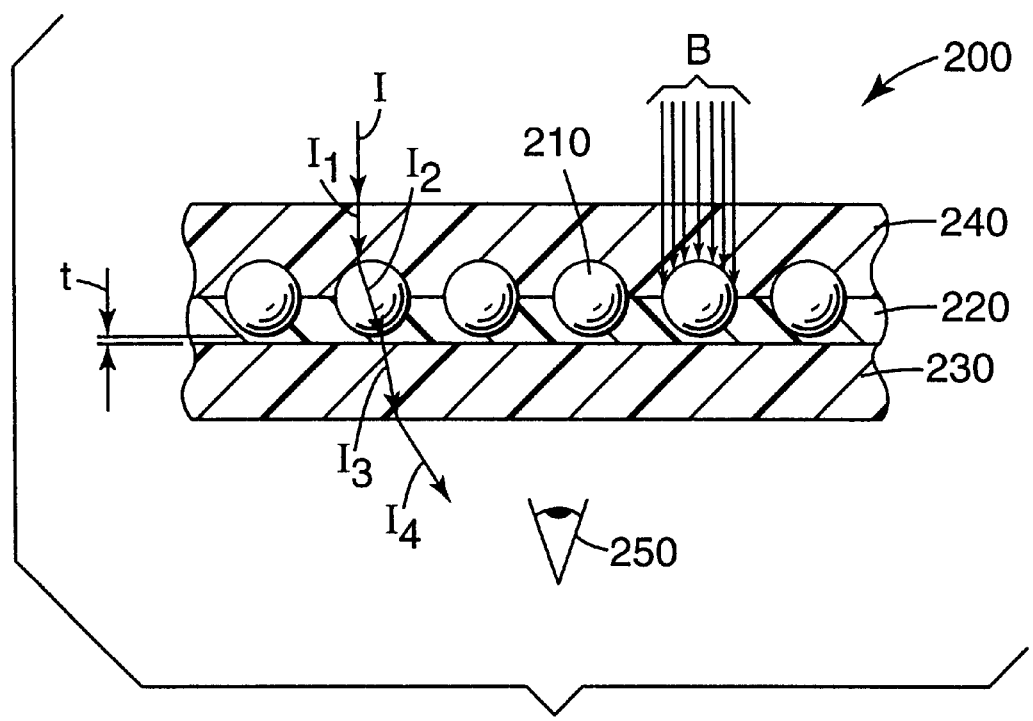
FIG. 2 is a partial schematic side view of a beaded rear projection screen construction that can be used to model performance characteristics.

FIG. 2 shows a model single-bead screen construction 200. Model screen construction 200 includes the basic elements used to calculate expected gain and throughput of a screen as described in the present document. These elements include a layer of microspheres 210 partially embedded in a light absorptive layer 220 residing on a substrate 230, and an optional overcoat 240 disposed over the exposed back portions of the microspheres. Light I is incident from the back of the screen, enters a microsphere, and can be transmitted to a viewer position 250 located at the front of the screen.

Various screen performance characteristics can be calculated via simple ray tracing techniques given the model construction, and in particular given the refractive index of the beads, the packing density of the beads, the refractive index of the absorptive layer, the optical density (or absorption coefficient) of the absorptive layer, the refractive index of the substrate, the thickness t of any portion of the absorptive layer residing directly between the microspheres and the substrate (or, conversely, for beads that contact the substrate, the amount by which the beads extend into the substrate), and the refractive index of the overcoat, if present. Screen performance characteristics that can be modeled include gain at a particular viewing angle, transmission (also referred to as throughput) at a particular viewing angle, overall angular range of viewability, and the like. The results of modeling by ray tracing are insensitive to the thickness of the optional overcoat and the thickness of the substrate.

Referring to FIG. 2, modeling of single-bead screen constructions can be performed via ray tracing where the rays used are a collection of evenly spaced rays of normally incident light that form a beam B whose width spans the diameter of a single bead and that is centered on the bead. Each ray of beam B is traced, and transmission is determined by calculating the collective intensity of the rays that exit the bead and enter substrate 230. Considering light ray I as an example of one light ray in a beam, $I_1$ represents the intensity of the ray in the optional overcoat, $I_2$ represents the intensity of the ray in the bead, $I_3$ represents the intensity of the ray in the substrate, and $I_4$ represents the intensity of the ray projected to the viewer position. In modeling transmission, it is most convenient to calculate transmission as the total intensity that exits the bead and enters the substrate. Thus, transmission T can be determined by:

$$T = \frac{\sum I_3}{\sum_B I}$$

for all incident light rays I in a beam B. Calculating transmission for a model screen construction in this manner eliminates the need to take internal reflections within the substrate into account. Because modeling is done over a single bead, any dependence of overall transmission on bead packing density is removed. This allows a direct comparison of different screen constructions without having to take packing density into account. Thus, the calculated transmission is sometimes referred to as relative transmission.

Figure 3A:
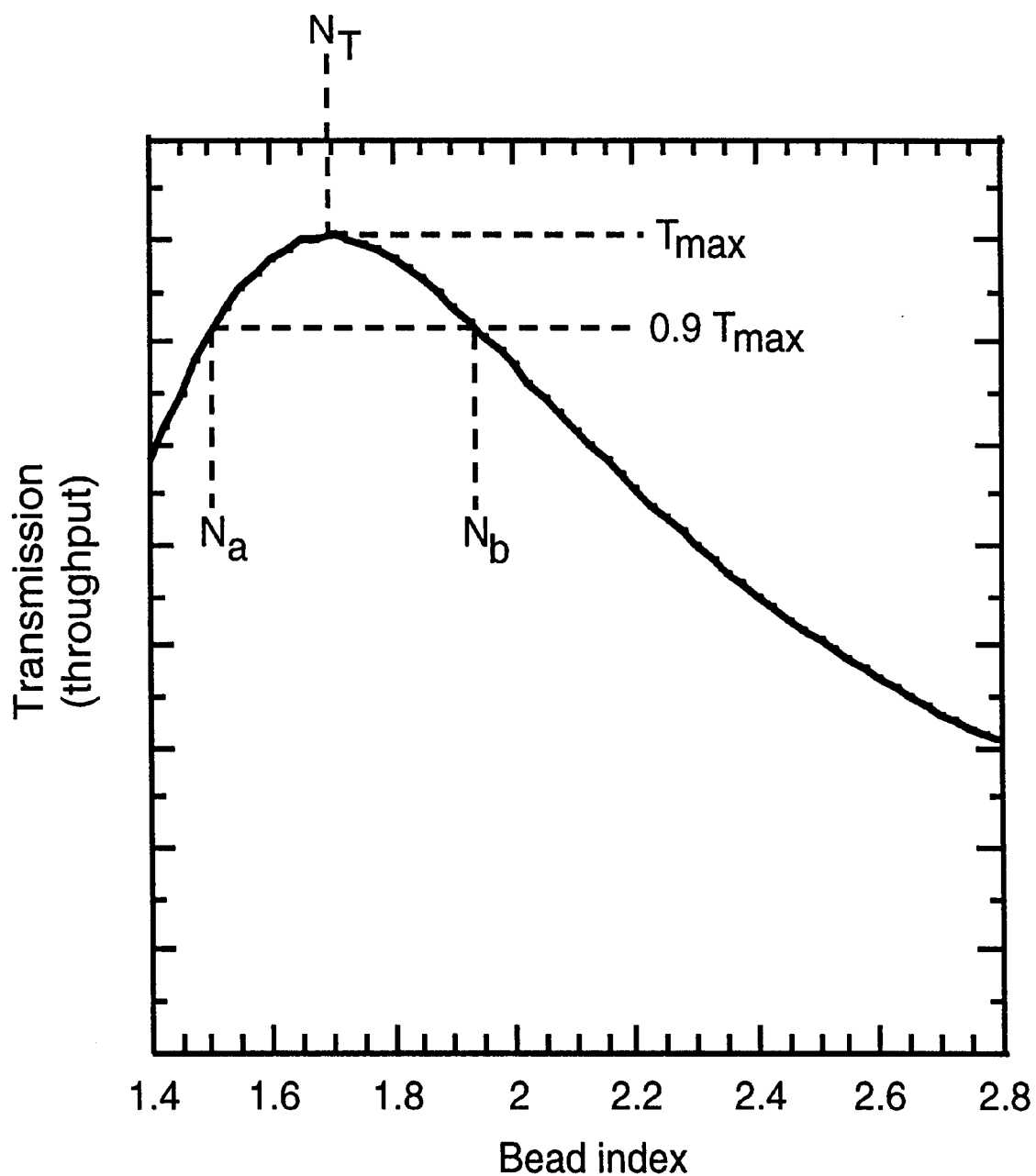
FIG. 3(a) is a plot of relative transmission versus bead index for a particular single bead rear projection screen construction.

FIG. 3(a) plots relative transmission versus bead index as determined from modeling a single-bead screen construction such as that shown in FIG. 2 where the optional overcoat has a refractive index of 1, corresponding to an air overcoat, or more precisely to a screen without an optional overcoat. The bead diameters were set at 60 microns and their refractive index was varied from 1.4 to 2.8. The refractive index of the light absorptive layer was set at 1.51, with the overall thickness of the absorptive layer being set at 25 microns and the absorption coefficient of the absorptive layer being set at $0.5\ \mu\text{m}^{-1}$. The thickness t between the microspheres and the substrate was set at 0.1 microns. The substrate had a refractive index set at 1.51, equal to the refractive index of the light absorptive layer. For each bead index from 1.4 to 2.8 at increments of 0.025, the transmission of a beam of normally incident rays spanning the diameter of a single bead was determined. Normally incident rays are those incident perpendicular to the plane of the screen. The results are plotted in FIG. 3(a).

As indicated by FIG. 3(a), for a particular single-bead screen construction, there is a bead index at which a transmission maximum is attained, labeled $T_{max}$ (and also referred to as the theoretical maximum throughput). The bead index at which $T_{max}$ is attained is labeled $N_T$.

While the plot shown in FIG. 3(a) represents the behavior of a model beaded screen construction that uses beads having the same index, the present invention contemplates beaded rear projection screens that include a uniform dispersion of two or more different refractive index beads. However, single bead model screen constructions and their calculated transmission versus bead index curves can be used in the present invention to determine a range of bead indices from which multiple bead types may be chosen. For example, FIG. 3(a) indicates the maximum theoretical throughput $T_{max}$ for the described screen construction, as well as the 90% of maximum throughput level, labeled $0.9T_{max}$. The 90% of maximum throughput level defines a range of bead indices, from $N_a$ to $N_b$ inclusive. Two or more bead types can be selected that have refractive indices in this range, and can be mixed at various ratios to form the bead layer of a beaded rear projection screen that has a gain that can be tuned according to the ratio of the bead types. For a two-bead screen, for example, the gain can be tuned in a range from the gain expected for a screen having only the first bead type (i.e., using a bead mixture having a high first bead to second bead ratio) to the gain expected for a screen having only the second bead type (i.e., using a bead mixture having a low first bead to second bead ratio). Additionally, because each bead type is selected so that it individually yields at least 90% maximum theoretical throughput, a relatively high transmission can be maintained for the multiple-bead type screen construction. The present inventors have also found that, for beads selected within the indicated range, there is a nearly linear dependence of gain on the bead mixing ratio. Therefore, the gain of the multiple-bead type screen can be predicted with sufficient accuracy to allow bead indices, bead mixing ratios, and screen construction to be pre-determined to produce a desired gain.

For a given screen construction, model single-bead transmission curves can be generated as shown in FIG. 3(a). These curves can then be used to select bead indices that can be mixed so that the gain of the resulting two-bead (or other multiple-bead) screen can be tuned. For example, to maintain high throughput and to achieve tunability to higher gains, it may be advantageous to choose a first bead index that is at or near $N_T$ (e.g., $n_1$ in the range $n_T \pm 0.05$), in exemplary embodiments $N_T$ or greater, and a second bead index that is sufficiently smaller than the first bead index to allow for tuning the gain over a meaningful range, but still about equal to or greater than $N_a$ (smaller indices yield higher gains) to maintain adequate throughput. Other options are also available such as choosing indices at or near each of $N_a$ and $N_b$ for a wider range of gain tunability while maintaining high throughput.

Figure 3B:
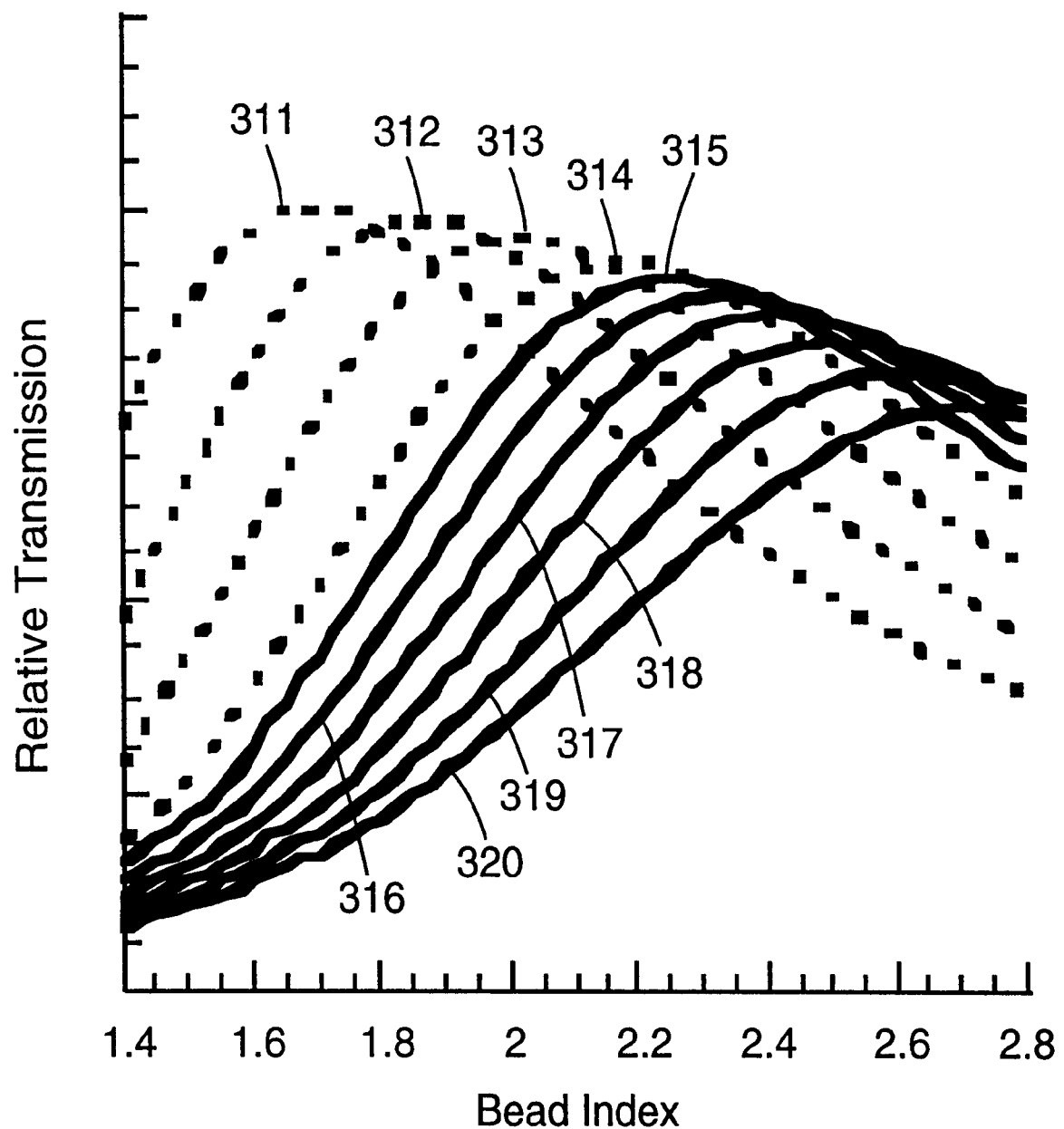
FIG. 3(b) shows relative transmission versus bead index plots for several different rear projection screen constructions.

While the present invention allows the selection of one or more bead indices for bead mixing to tune the gain and maintain throughput, the present invention also allows for re-designing the screen construction given one or more particular bead indices or a range of bead indices. For example, a screen manufacturer might have an inventory of a few different bead types, each type having a different refractive index. In such a situation, the ability to select a bead index may be limited. The present invention contemplates adjusting or modifying the screen construction so that pre-determined or pre-selected bead indices fit within the range from $N_a$ to $N_b$ inclusive for the modified screen construction. By way of example, FIG. 3(b) shows a series of transmission curves 311, 312, 313, 314, 315, 316, 317, 318, 319, 320, each similar to the one shown in FIG. 3(a). The FIG. 3(b) curves were generated using the same construction as for the FIG. 3(a) curve except that the index for the overcoat was varied from 1.0 (air) to 1.6. Specifically, curve 311 was generated using an overcoat index of 1.0, curve 312 was generated using an overcoat index of 1.1, curve 313 was generated using an overcoat index of 1.2, curve 314 was generated using an overcoat index of 1.3, curve 315 was generated using an overcoat index of 1.35, curve 316 was generated using an overcoat index of 1.4, curve 317 was generated using an overcoat index of 1.45, curve 318 was generated using an overcoat index of 1.5, curve 319 was generated using an overcoat index of 1.55, and curve 320 was generated using an overcoat index of 1.6.

FIG. 3(b) indicates that the peak of the transmission curve can be shifted by varying the overcoat index. By shifting the transmission curve peak, the range of suitable bead indices (e.g., $N_a$ to $N_b$) is expanded. This increases the likelihood that a pre-determined set of bead indices can be made to fall within a range of bead indices that maintains sufficiently high throughput and allows for predictable gain tunability.

The positions of the transmission curve peaks can be further fine tuned by adjusting the thickness t of the light absorbing layer between the beads and the substrate, and/or by adjusting the optical density of the light absorbing layer material and/or adding a diffuser to one or more of the absorbing layer, the substrate, the optional overcoat, or in a separate layer. In fact, any adjustment in the screen construction that can result in a change in the effective bead exit aperture can be used to shift the transmission peak relative to bead index. For example, in constructions where the microspheres do not contact the substrate so that there exists some light absorbing material between the microspheres and the substrate, light absorbing materials having higher optical densities tend to make the effective exit aperture smaller. This results in lower maximum transmission, a narrower transmission peak, and a slight shift of the transmission peak to high bead indices. In constructions where the beads protrude all the way through the light absorbing layer, the amount of protrusion will directly affect the exit aperture. Other possibilities exist and are contemplated in the present invention.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

Each of the patents, patent documents, and publications cited above is hereby incorporated into this document as if reproduced in full.

What is claimed is:

1. A rear projection screen comprising:
   a beaded screen construction comprising a substrate transmissive to visible light, a visible light absorptive material disposed on the substrate, and a layer of microbeads embedded in the light absorptive material to leave a portion of the microbead layer exposed;
   wherein the beaded screen construction has a maximum theoretical throughput, and $n_T$ defines a microbead index of refraction at which the maximum theoretical throughput is attained, and
   wherein the layer of microbeads comprises a plurality of first microbeads having a first index of refraction and a plurality of second microbeads having a second index of refraction, the first index of refraction being in a range of $n_T \pm 0.05$, inclusive, and the second index of refraction being different than the first index of refraction.

2. The rear projection screen of claim 1, wherein the screen construction further comprises an overcoat disposed over the exposed portion of the microbead layer.

3. The rear projection screen of claim 1, wherein the second index of refraction is less than the first index of refraction.

4. The rear projection screen of claim 1, wherein the second index of refraction is greater than the first index of refraction.

5. The rear projection screen of claim 1, wherein the layer of microbeads further comprises a plurality of third microbeads having a third index of refraction that is different from the first and second indices of refraction.

6. A rear projection screen comprising:

a beaded screen construction comprising a substrate transmissive to visible light, a visible light absorptive material disposed on the substrate, and a layer of microbeads embedded in the light absorptive material to leave a portion of the microbead layer exposed;

wherein the beaded screen construction has a maximum theoretical throughput, $n_T$ defines a microbead index of refraction at which the maximum theoretical throughput is attained, and $n_a$ to $n_b$ defines a range of microbead indices that includes $n_T$ and all other refractive indices that yield a calculated throughput of about 90% or more of the maximum theoretical throughput, and wherein the layer of microbeads comprises a first plurality of microbeads that have a refractive index of about $n_a$ and a second plurality of microbeads that have a refractive index of about $n_b$.

7. A rear projection screen comprising:

a substrate transmissive to visible light;

a visible light absorptive material disposed on the substrate; and a layer of microbeads partially embedded in the light absorptive material to leave the microbeads exposed to an air interface, the layer of microbeads consisting essentially of a uniform dispersion of microbeads having a refractive index of about 1.65 and microbeads having a refractive index of about 1.5, wherein the rear projection screen has a gain that corresponds to the gain of a theoretical screen having the same construction but with a layer of microbeads that includes only microbeads having an index of refraction about equal to $(1.65a+1.5b)/(a+b)$, where a:b is the ratio of 1.65 index microbeads to 1.5 index microbeads.

* * * * *